No. 740,975. PATENTED OCT. 6, 1903.
A. H. M. DRIVER & G. NORMAN.
APPARATUS FOR TESTING AND STRAIGHTENING GUN BARRELS
OR TUBULAR ARTICLES.
APPLICATION FILED JULY 28, 1903.
NO MODEL. 3 SHEETS—SHEET 1.
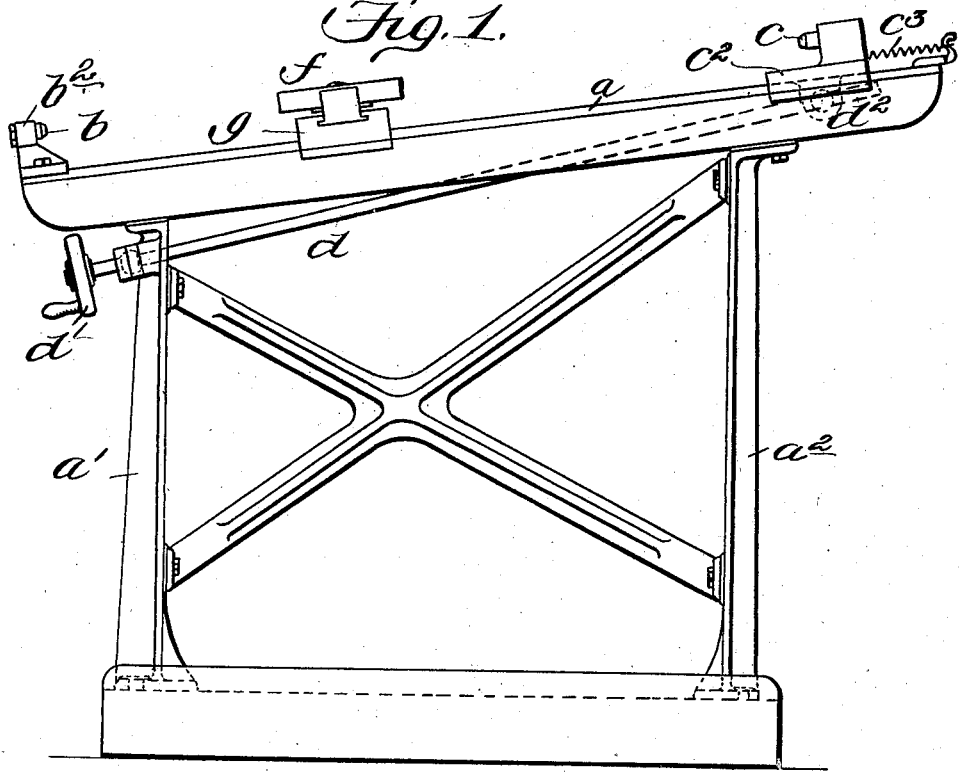
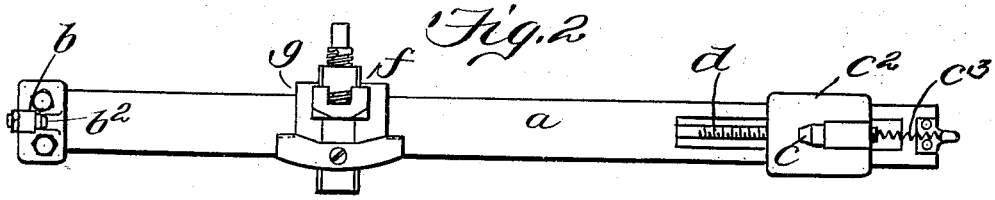
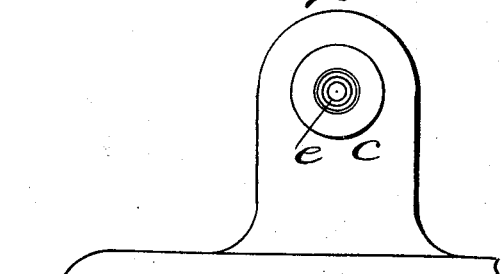
Witnesses:
Inventors
Augustus H. M. Driver
George Norman
By James L. Norris
Atty

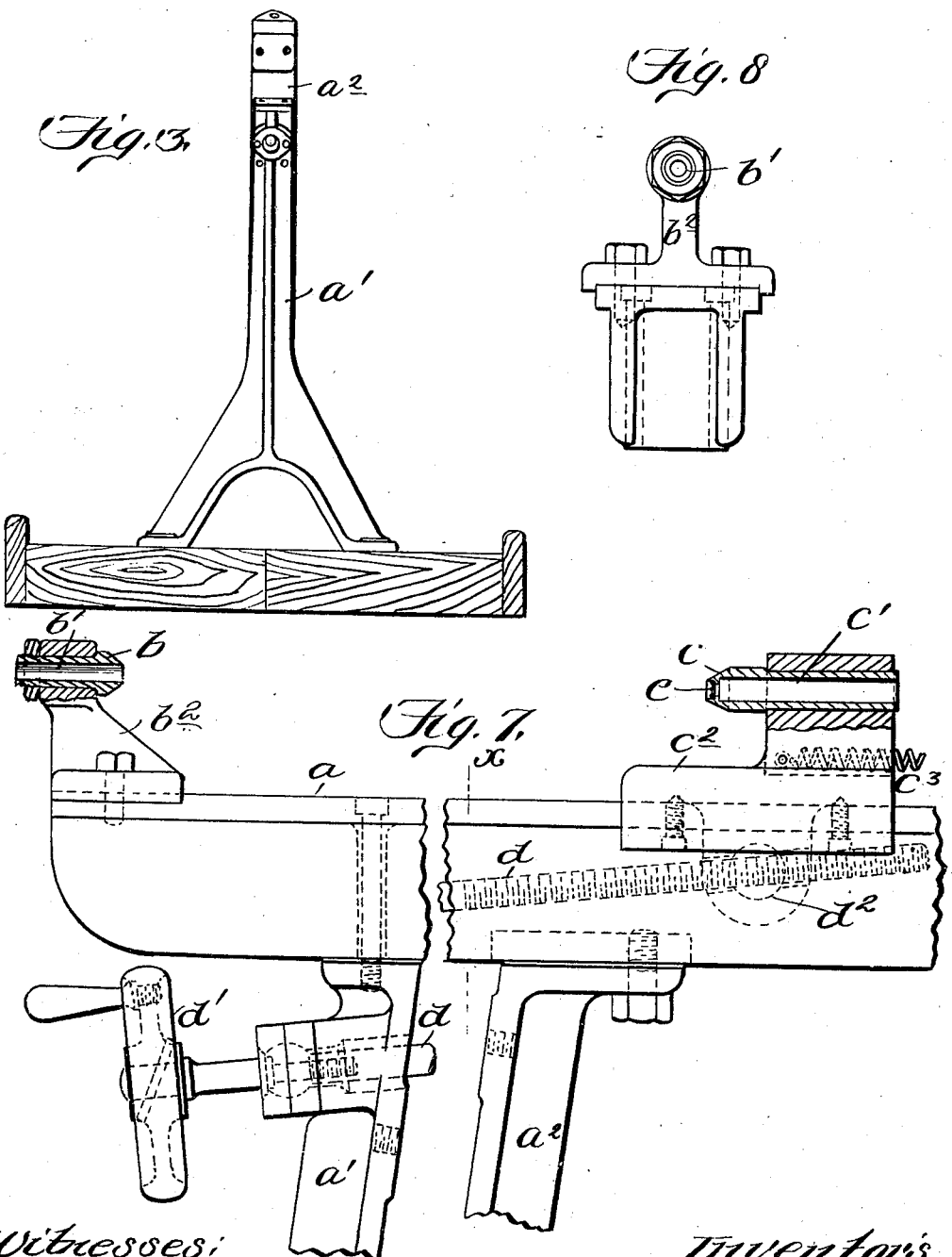

No. 740,975. PATENTED OCT. 6, 1903.
A. H. M. DRIVER & G. NORMAN.
APPARATUS FOR TESTING AND STRAIGHTENING GUN BARRELS
OR TUBULAR ARTICLES.
APPLICATION FILED JULY 28, 1903.
NO MODEL. 3 SHEETS—SHEET 3.
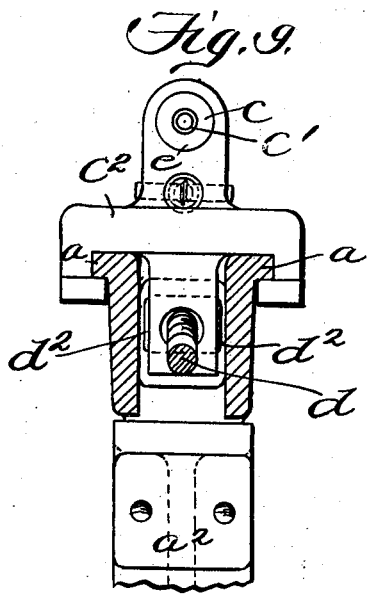
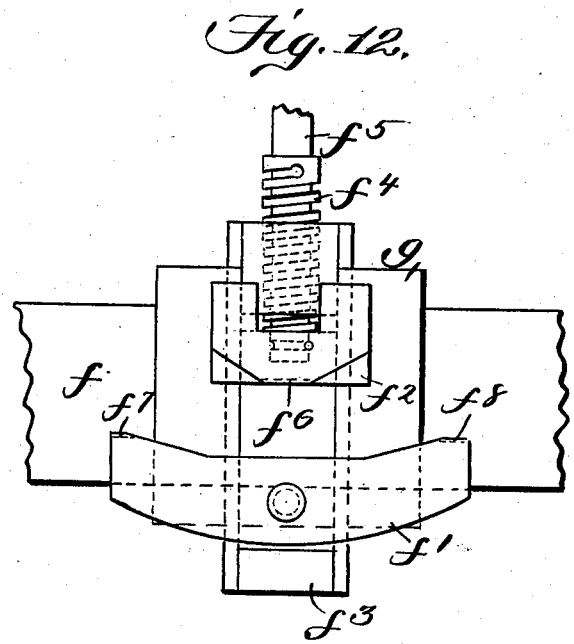
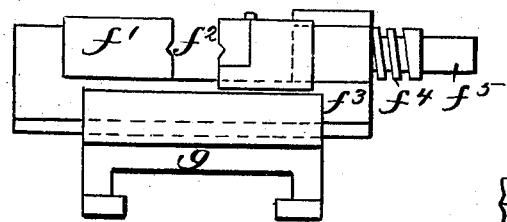
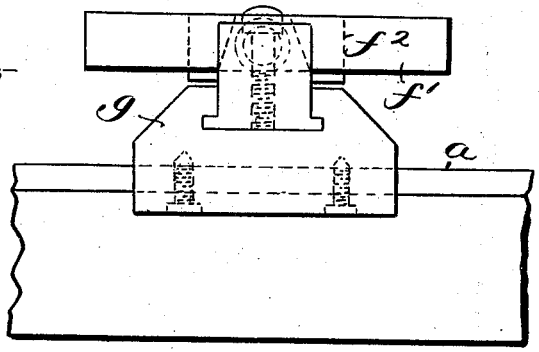

No. 740,975. Patented October 6, 1903.

UNITED STATES PATENT OFFICE.

AUGUSTUS HENRY MURRAY DRIVER AND GEORGE NORMAN, OF BIRMINGHAM, ENGLAND.

APPARATUS FOR TESTING AND STRAIGHTENING GUN-BARRELS OR TUBULAR ARTICLES.

SPECIFICATION forming part of Letters Patent No. 740,975, dated October 6, 1903.

Original application filed March 21, 1903, Serial No. 148,980. Divided and this application filed July 28, 1903. Serial No. 167,312. (No model.)

*To all whom it may concern:*

Be it known that we, AUGUSTUS HENRY MURRAY DRIVER and GEORGE NORMAN, subjects of the King of Great Britain, residing at Small Heath, Birmingham, England, have invented certain new and useful Improvements in Apparatus for Testing and Straightening Gun-Barrels or Tubular Articles, of which the following is a specification.

This invention relates to certain new and useful improvements in apparatus for testing for or detecting and correcting faults or errors in straightness in the bore of a gun or rifle barrel or other tubular article, and is a division of application Serial No. 148,980, filed March 21, 1903.

In the usual method of testing the bore of a gun or rifle barrel, tube, or the like for straightness the object is pointed toward a window or lighted opening along the top of which is fitted a black board having a straight lower edge. On looking through the barrel when pointed a few inches below the edge of the black board a shade or shadow will be observed along the lower part of the bore of the barrel commencing at the end nearest to the light and extending as far back as the middle of the barrel. While looking through the bore the observer rotates the barrel and by the shape or outline of the shadow he is able to judge whether the bore is straight or otherwise and the location of any faults or distortions that may occur. This method of testing is open to several objections, the principal of which are that it is not absolutely certain in its results and is entirely dependent for its success upon the skill and judgment of highly-trained operators.

The invention aims to construct an apparatus for the purpose hereinbefore referred to which shall overcome the objections herein set forth and is so constructed and arranged as to support the gun-barrel or other tubular article in an inclined or other position, at the same time to permit the barrel or other article being rotated or other suitable movement imparted thereto, the barrel or other article being supported in a direction which points toward a window or other source of light in such a manner that light may pass into the bore of the barrel, providing means at one end of the barrel which will break up a light falling thereon and produce annular shadows or shades or which are projected onto the walls of the bore of the article, which presents a smooth or polished cylindrical mirror-like or reflecting surface, and which will reflect the said projected shadows into the form of a series of dark bands or rings alternating with and separated by luminous bands or rings of light, the effect and intensity in the appearance of the said rings being heightened by contrast with the alternate and adjacent shade-rings. Thus the effect or appearance presented to the eye of an observer looking along the said bore from the back end is that of a number or continuous series of alternating light or luminous and dark rings or alternating bands or circles of black and white lying one within the other for a considerable distance along the said bore. Each individual ring or band of the series corresponds to a known and determinate portion in the length of the barrel, and when the barrel under test is straight and true throughout then on the barrel being rotated between the centers or supports the whole of the bands or circles have the appearance of lying truly concentric one within the other; but should the barrel be out of true or in fault in respect of the parallelism of its walls at any part then the particular light or dark band which corresponds to the position of the fault will appear to be eccentric relative to the other bands.

The invention further aims to provide means for setting or correcting faults in gun-barrels or tubular articles when detected.

The invention further aims to construct an apparatus for the purpose specified which shall be simple in its construction, strong, durable, efficient in its use, and comparatively inexpensive to set up; and to this end the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 1 of the drawings represents a side elevation of one form of combined barrel testing and correcting machine constructed and arranged in accordance with our invention, and Fig. 2 is a top plan of the same. Fig. 3 shows an elevation of the back or eye piece and of the stand on which the said machine or appliance is supported. Fig. 4 represents, upon an enlarged scale, an end view of the forward hollow center in which the light screen or mask is fitted. One form of screen for admitting alternating rings of light and shade is shown in this view fitted into the hollow or axial opening in the said center, and two other forms of screen for producing similar effects are represented separately in Figs. 5 and 6. Fig. 7 represents, upon a smaller scale than Fig. 4, an elevation of the front and back ends of the machine, but with the hollow centers and their supporting head-stocks being shown in longitudinal vertical section. Fig. 8 is an end view of the back or eye piece center with its supporting head-stock. Fig. 9 represents a cross-sectional view of the appliance upon the dotted line $x$, Fig. 7, looking toward the forward head-stock and center. Figs. 10, 11, and 12 represent in end elevation, side elevation, and top plan, respectively, the adjustable truing or straightening cramp with which the appliance shown in Figs. 1 and 2 is provided.

The same letters of reference indicate corresponding parts in the several figures of the drawings.

$a$ is an inclined or sloping base or bed plate, rigidly supported upon braced standards $a'$ $a^2$ and provided at the upper and lower ends with hollow and stationary or non-rotatable centers $b$ and $c$, between which the barrels are pivotally supported, so as to admit of being rotated relative to the said stationary centers in such a position that the bore of the barrel is axially lignable with the bores $b'$ $c'$ of the said hollow centers, the rearward one of which is mounted in a fixed head-stock $b^2$, while the other center, which is located at the elevated end of the bed and nearest to the source of light, is carried in adjustable head-stock $c^2$, capable of longitudinal adjustment upon the bed or table for the purpose of regulating the distance between the two centers to suit different lengths of barrels and for advancing and retiring the said center for securing and releasing a barrel in and from its position. This adjustment and affixing and releasing of the forward head-stock and center may be effected by means of a traversing screw $d$, mounted in suitable bearings on the under side of the table and provided at the rearward or operator's end of the machine with a hand-wheel $d'$, while the screwed part of the same is directed through a trunnioned screw-box $d^2$, attached to the under side of the said head-stock, which has in connection with it a spring $c^3$ for steadying the motion and assisting in adjustment of the forward center away from the back center, it being understood that in every case the barrel is secured between the supporting-centers in such a manner as will admit of the same being freely rotated by the operator during the time that the bore is being inspected through the eyepiece-aperture or hollow of the back center.

In the arrangement shown in the drawings the screen or disk $e$, with the opaque and transparent parts, is mounted inside the hollow of the forward center, to which it is fixedly or detachably secured in any convenient manner, so that it is interposed between the bore of a barrel mounted between the centers of the source of light, so that the whole of the light admitted into the fore end of the bore has to pass through the transparencies of the screen.

$f$ is the adjustable cramp or press provided for the purpose of applying lateral pressure to the outer walls of a barrel and springing the same at the point or points where a fault or inaccuracy in the bore may have been found by test to exist for the purpose of rectifying the same. The said cramp is mounted upon a slide-rest $g$, which admits of being traversed or pushed by the hand of the viewer to any point between the centers where it may be required, and the particular construction shown in the drawings consists of a fixed jaw $f'$ and a movable jaw $f^2$, which is adjustable laterally along a transverse slide $f^3$ by means of a screw $f^4$ to the stem $f^5$, of which a hand-wheel, key, or lever may be fitted to enable the desired amount of lateral pressure being applied at the desired points in the length of the barrel, such applications of pressure being continued until the operator ascertains that the whole of the rings of light and shade reflected within the bore are perfectly concentric and remain so when the barrel is rotated between its center.

The opposed faces of the jaws are provided at $f^6$ $f^7$ $f^8$ with grooves or channels to form separated seatings for the parts of the barrel to which the pressure is to be applied.

Having thus fully described our invention, what we claim as new, and desire to secure by Letters Patent, is—

1. An apparatus for testing the straightness of gun-barrels and other tubular articles, consisting of hollow centers, supports between which a barrel or tubular article is mounted with its bore presented to a source of light and in axial line with the hollows or openings of the said centers or support, the forward center being fitted or provided with a device having transparent or open and opaque or solid parts, substantially as herein described.

2. An apparatus for testing the straightness of gun-barrels and other tubular articles and for correcting faults therein; consisting of hollow centers; supports mounted upon a bed and between which a barrel or article is secured for testing purposes, in combination with means for applying pressure, said means being adjustable along the table whereon the barrel-supports are mounted so as to admit of pressure being applied to the barrel for the purpose of springing the same at any point where a fault may have been found, by test, to exist, substantially as herein described.

3. An apparatus for testing and correcting the straightness of gun-barrels and other tubular objects consisting of a bed-plate, supporting means therefor, means for supporting the barrel upon said bed-plate, said means permitting of the rotation of said barrel, means for projecting a plurality of bands of alternating lights and shadows upon the wall of the bore of the barrel for detecting the faults thereon, and adjustable means adapted to engage the barrel and when operated to correct the detected faults.

4. In an apparatus for testing the straightness of gun-barrels and other tubular articles, means for supporting the articles to be operated upon, means for projecting into the bore of the article alternating bands of light and shadows for detecting the faults of the articles, and means for correcting the detected faults.

5. In an apparatus for testing the straightness of gun-barrels and other tubular articles, means for supporting the articles to be operated upon, means for projecting into the bore of the articles alternating bands of light and shadows for detecting faults in the articles, and adjustable means for correcting the detected faults.

6. In an apparatus for testing the straightness of gun-barrels and other tubular articles, means for supporting the article, means arranged at one end of the article for projecting into the bore thereof, alternating bands of lights and shadows for detecting the faults of the said articles, and means for exerting pressure against the article to correct the detected faults thereof.

7. In an apparatus for testing the straightness of gun-barrels and other tubular articles, means for supporting the article, means arranged at one end of the article for projecting into the bore thereof, alternating bands of lights and shadows for detecting the faults of the said articles, and adjustable means for exerting pressure against the article to correct the detected faults thereof.

8. In an apparatus of the character described, means for supporting a tubular article, said means adapted to permit of the rotation of said article, means arranged at one end of the article for projecting into the bore thereof, alternating bands of lights and shadows for detecting the faults in the article, and means for exerting pressure against the article to correct the detected faults thereof.

9. In an apparatus of the character described, means for supporting a tubular article, said means adapted to permit of the rotation of said article, means arranged at one end of the article for projecting into the bore thereof, alternating bands of light and shadows for detecting the faults in the article, and adjustable means for exerting pressure against the article to correct the detected faults thereof.

10. In an apparatus of the character described, a fixed and an adjustable means for supporting a tubular article, means arranged at one end of the article for projecting into the bore thereof, alternating bands of lights and shadows to detect the faults in the article, and means engaging with the article and adapted to exert pressure thereon for correcting the detected faults thereof.

11. In an apparatus of the character described, a fixed and an adjustable means for supporting a tubular article, means arranged at one end of the article for projecting into the bore thereof, alternating bands of lights and shadows to detect the faults in the article, and adjustable means engaging with the article and adapted to exert pressure thereon for correcting the detected faults thereof.

12. In an apparatus of the character described, a fixed and an adjustable means for supporting a tubular article, said supporting means adapted to permit of the rotating of said article, means arranged at one end of the article for projecting into the bore thereof, alternating bands of lights and shadows to detect the faults in the article, and means engaging with the article and adapted to exert pressure thereon for correcting the detected faults thereof.

13. In an apparatus of the character described, a fixed and an adjustable means for supporting a tubular article, said supporting means adapted to permit of the rotation of said article, means arranged at one end of the article for projecting into the bore thereof, alternating bands of lights and shadows to detect the faults in the article, and adjustable means engaging with the article and adapted to exert pressure thereon for correcting the detected faults thereof.

In testimony whereof we have hereunto set our hands in presence of two subscribing witnesses.

AUGUSTUS HENRY MURRAY DRIVER.
GEORGE NORMAN.

Witnesses:
HENRY SKERRETT,
ARTHUR SADLER.